United States Patent Office 3,487,713
Patented Jan. 6, 1970

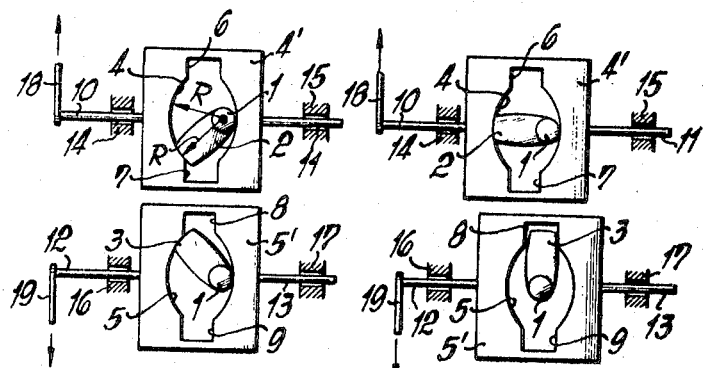
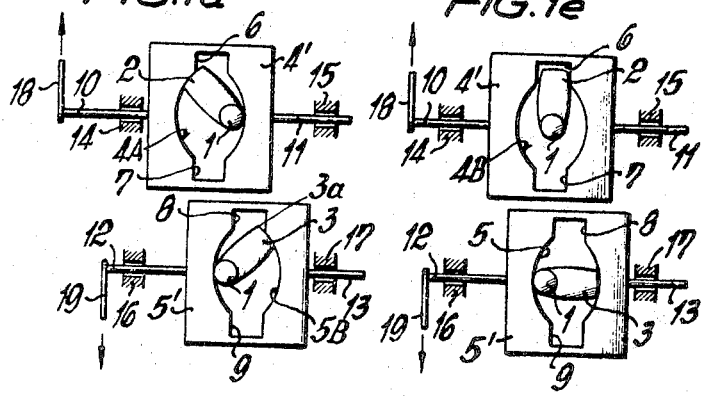
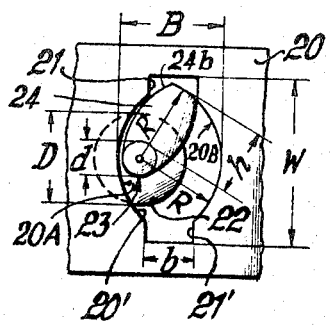
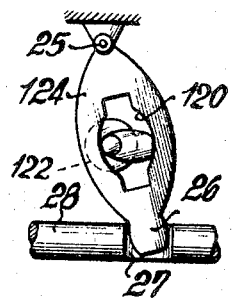
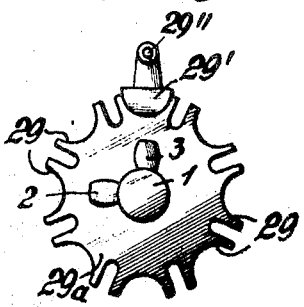

3,487,713
TRANSMISSION SHIFTING MECHANISM
Hans Stürmer, Stuttgart, Germany, assignor to Robert Bosch G.m.b.H., Stuttgart, Germany
Filed July 31, 1968, Ser. No. 749,208
Claims priority, application Germany, Aug. 11, 1967, B 93,928
Int. Cl. G05g *9/00, 13/00;* F16h *25/08*
U.S. Cl. 74—473
12 Claims

ABSTRACT OF THE DISCLOSURE

A shifting mechanism for progressive transmissions comprises a rotary shaft which carries two axially spaced wipers angularly offset with reference to each other by 90 degrees. Each wiper turns in a substantially elliptical slot provided in a reciprocable or oscillatable motion transmitting member which is rigid with a shifter fork. Each slot has two extensions located diametrically opposite each other and each such angular position of the shaft in which a wiper extends into one extension of the respective slot corresponds to a different speed position of the transmission. The distance between the outermost parts of the extensions of a slot at least equals 2R wherein R is the distance between the axis of the shaft and the outer end portion of the respective wiper. The slots are flanked by pairs of concave internal surfaces which extend between the respective extensions and the maximum width of a slot between the medan portions of the respective concave surfaces at least equals $R+d/2$ wherein $d$ is the diameter of the ground circle of the respective wiper, i.e., the diameter of that portion of the shaft from which the respective wiper extends radially outwardly.

Background of the invention

The present invention relates to improvements in transmission shifting mechanisms, and more particularly to improvements in shifting mechanisms which are especially suited for use in connection with automatic progressive transmissions.

Summary of the invention

One of the objects of my invention is to provide a simple, compact and reliable shifting mechanism which permits accurate shifting of a progressive transmission into a selected speed position.

Another object of the invention is to provide a shifting mechanism which can be utilized for shifting of conventional progressive transmissions.

A further object of the invention is to provide a shifting mechanism which is particularly suited for use in connection with four-speed progressive transmissions.

A concomitant object of the invention is to provide an improved shifting mechanism of the type wherein rotary movement of the control member is converted into reciprocatory movement of one or more shifter forks or the like.

The improved shifting mechanism comprises a control member which preferably constitutes a shaft and is rotatable about a predetermined axis in a first direction to shift the transmission from a lower to a higher speed and in a second direction to shift from a higher to a lower speed, a pair of identical axially and angularly offset wipers extending radially from the control member, a separate reciprocable or oscillatable motion receiving member for each wiper, and a pair of motion transmitting means each operatively connected to one of the motion receiving members and each preferably comprising a shifter fork which can change the axial position of a sliding gear in a progressive transmission. In accordance with a feature of my invention, each motion receiving member comprises a substantially elliptical slot for the respective wiper and each slot is provided with two extensions disposed diametrically opposite each other and receiving the outer end portion of the respective wiper in response to each half-revolution of the control member. The motion receiving members further comprise concave internal surfaces whose radii of curvature equal or approximate the distance between the axis of the control member and the outer end portion of the respective wiper. The maximum width of the solts between the median portions of the respective internal surfaces preferably at least equals the sum of distances between the axis of the control member and the inner and outer end portions of the respective wiper, and the distance between the outermost parts of the extensions in each of the slots at least equals twice the distance between the axis of the control member and the outer end portion of the respective wiper.

The novel features which are considered as characteristic of the invention are set forth in particular in the appended claims. The improved shifting mechanism itself, however, both as to its construction and its mode of operation, together with additional features and advantages thereof, will be best understood upon perusal of the following detailed description of certain specific embodiments with reference to the accompanying drawing.

Brief description of the drawing

FIG. 1b is a schematic front elevational view of the shifting mechanism with the control shaft shown in an intermediate position;

FIG. 1c is a similar schematic front elevational view but showing the control shaft in a position corresponding to the second-speed position of the transmission;

FIG. 1d is a similar schematic front elevational view and shows the control shaft in a second intermediate position;

FIG. 1e is a similar schematic front elevational view and shows the control shaft in a position corresponding to the third-speed position of the transmission;

FIG. 2 is a fragmentary schematic front elevational view of a second shifting mechanism;

FIG. 3 is a similar fragmentary front elevational view of a third shifting mechanism;

FIG. 5 illustrates an indexing device for the control shaft of the shifting mechanisms.

DESCRIPTION OF THE PREFERRED EMBODIMENTS

Figure 1A:
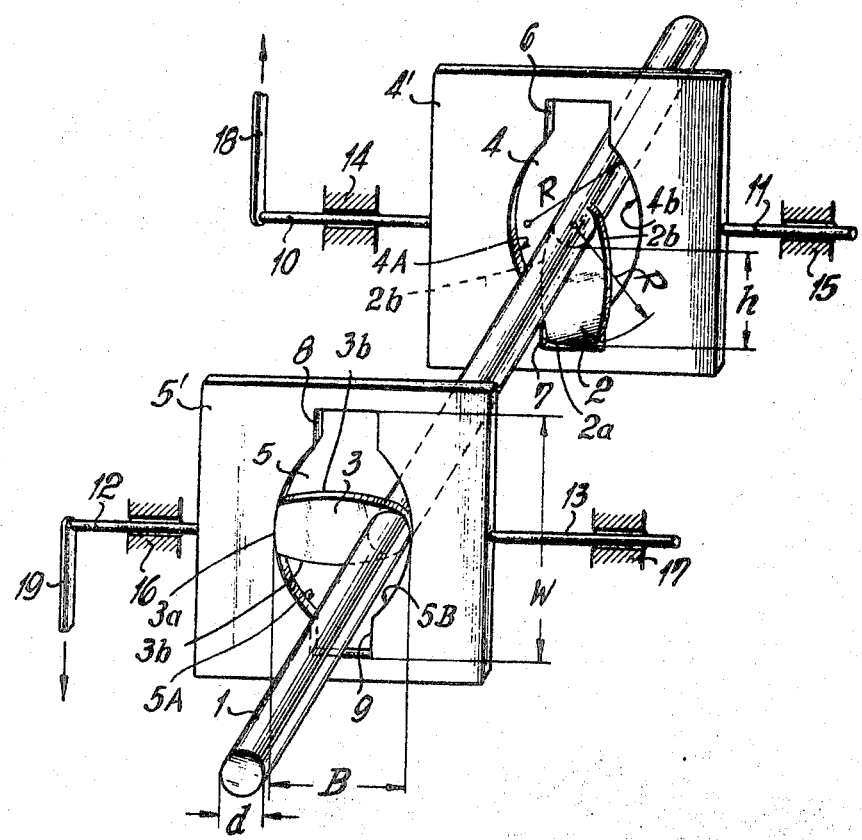
FIG. 1a is a partly schematic perspective view of a shifting mechanism which embodies one form of the invention and wherein the angular position of the control shaft corresponds to the first-speed position of the transmission.

Referring first to FIG. 1a, there is shown a shifting mechanism for a progressive transmission. It comprises a control shaft 1 which is rotatable about a predetermined axis and has a diameter $d$. This control shaft 1 carries two axially and angularly spaced wipers 2, 3. The angular spacing between the wipers 2, 3 is 90 degrees and the distance $h$ between the inner and outer end portions of each wiper equals $R$ minus $d/2$ wherein $R$ is the distance between the axis of the control shaft 1 and the convex top land 2a or 3a of the wiper 2 or 3. It will be noted that each wiper resembles a gear tooth with a convex top land 2a or 3a and two convex flanks 2b or 3b.

The wiper 2 is accommodated in a specifically configurated slot 4 machined into a reciprocable motion receiving member or slide 4' and the wiper 3 is rotatable in a similar slot 5 provided in a second reciprocable motion receiving member or slide 5'. Each of the slots 4, 5 is of generally elliptical outline. The slot 4 is provided with two extensions 6, 7 which are located diametrically opposite each other and extend in the direction of the major axis of the respective ellipse. The extensions of the slot 5 are shown at 8 and 9. The distance W between the outermost parts of the extensions 6, 7 or 8, 9 at least equals $2h+d=2R$, i.e., at least twice the distance between the axis of the control shaft 1 and the outer end portion of the wiper 2 or 3. The slide 4' is formed with two concave internal surfaces 4A, 4B which surround a portion of the slot 4 and whose radii of curvature equal R, i.e., the distance between the axis of the shaft 1 and the outer end portion of the wiper 2. The internal surfaces of the slide 5' in the slot 5 are shown at 5A and 5B. The maximum distance B between the internal surfaces 5A, 5B (as measured along the minor axis of the respective ellipse) at least equals $h+d$ (or $R$ plus $d/2$). The same applies for the distance between the central portions of the concave internal surfaces 4A, 4B.

The slide 4' is rigid with a motion transmitting unit which includes two coaxial trunnions 10, 11 extending in opposite directions and registering with the minor axis of the slot 4. The common axis of the trunnions 10, 11 is normal to and intersects the axis of the control shaft 1. The trunnions 10, 11 are respectively reciprocable in guide means here shown as slide bearings 14, 15 and the outer end of the trunnion 10 is connected with a shifter fork 18. The motion transmitting unit which is operatively connected with the slide 5' comprises two coaxial trunnions 12, 13 which are reciprocable in slide bearings or guide means 16, 17 and the former of which is rigid with a shifter fork 19. The manner in which the shifter forks 18, 19 can change the speeds of a progressive transmission will be described in connection with FIG. 6. If desired, the parts 4', 10, 11, 18 and/or 5', 12, 13, 19 may be integral with each other. The trunnions 10–13 are located in a common plane which includes the control shaft 1.

When the control shift 1 is caused to rotate stepwise, the slides 4', 5' are moved in a direction to the left or to the right, as viewed in FIG. 1a, and thereby transmit motion to the forks 18, 19 by way of the respective trunnions 10, 12. The positions of the slides 4', 5' in FIG. 1a correspond to the first-speed position of the transmission. The fork 19 then maintains the associated sliding gear in a position in which the sliding gear maintains the corresponding gears or the corresponding synchronizing device of the transmission in disengaged position.

FIG. 1b illustrates the control shaft 1 of the shifting mechanism in an intermediate position in which the forks 18, 19 are about to change the ratio of the transmission from first to second speed. For the sake of simplicity, the slides 4', 5' (represented by their slots 4, 5) are shown above rather than behind each other. During rotation from the position of FIG. 1a to that of FIG. 1b, the control shaft 1 has completed one-eighth of a full revolution in a clockwise direction. When the control shaft 1 completes one-fourth of a full revolution (FIG. 1c), the transmission is shifted to second speed.

When the control shaft 1 starts to leave the angular position of FIG. 1, the slide 5' temporarily remains in the illustrated position because the top land 3a of the wiper 3 continues to slide along the concave internal surface 5A. However, the wiper 2 (which was in registry with and was received in the extension 7 of the slot 4) shifts the slide 4' in a direction to the left and thereupon begins to move its top land 2A along the concave internal surface 4A. The transmission remains in first speed while the wipers 2, 3 assume the positions shown in FIG. 1b. The shifting to second speed is in preparation.

When the control shaft 1 completes one-fourth of a full revolution after leaving the position of FIG. 1a, the wiper 2 maintains the slide 4' in its left-hand end position (FIG. 1c) and the fork 18 then maintains the transmission in second speed. At the same time, or at about the same time, the wiper 3 enters the extension 8 of the slot 5 and maintains the slide 5' in a neutral position which the slide 5' assumes when the control shaft 1 completes an angular displacement through 90 degrees. The fork 19 then maintains the corresponding sliding gear in a position in which the gears which mesh in the first-speed position of the transmission are disengaged, i.e., the fork 19 is in a neutral or zero position.

FIG. 1d illustrates the control shaft 1 of the shifting mechanism in a second intermediate position during an intermediate stage of shifting from second to third speed. The transmission is shifted to third speed when the wipers 2, 3 and the corresponding slides 4', 5' assume the positions shown in FIG. 1e. The shifting mechanism maintains the transmission in second speed when the wipers 2, 3 assume the positions shown in FIG. 1d because the wiper 2 continues to travel along the internal surface 4A whereas the wiper 3 is about to move away from registry with the extension 8, i.e., the top land 3a of the wiper 3 is about to travel along the concave internal surface 5B and to shift the slide 5' in a direction to the right. When the control shaft 1 assumes the position of FIG. 1e, the slide 4' maintains the fork 18 in neutral position, i.e., the gears which establish the second speed are out of mesh. The wiper 3 maintains the slide 5' in a position in which the fork 19 shifts the transmission to a third speed. The fourth speed is set when the wiper 3 extends into the extension 9 and the wiper 2 engages the median portion of the concave internal surface 4B.

FIG. 2 illustrates a portion of a second shifting mechanism. It comprises a reciprocable motion receiving member or slide 20 formed with a slot 20' which corresponds exactly to the slot 4 or 5 of FIG 1a. The distance between the outermost parts of extensions 21, 21' of the slot 20' is shown at W, the width of extensions 21 or 21' at $b$, and the distance between the central portions of concave internal surfaces 20A, 20B of the slide 20 at B. The control shaft 22 carries a wiper 24 and is formed with a circumferentially extending groove 23 which registers with the slot 20' and whose depth is such that, in the illustrated position of the wiper 24, the outer end of the radius R of the wiper is close to the corner between the extension 21 and the adjoining end of the concave internal surface 20B. At the same time, the left-hand flank 24b of the wiper 24 defines a narrow gap with the adjoining portion of the internal surface 20A. The diameter of the control shaft 22 is shown at D and is slightly less than the distance B. This is desirable in order to facilitate the assembly of the shifting mechanism, i.e., to move the shaft 22 axially through the slot 20' so that the latter registers with the groove 23. The distance between the inner and outer end portions of the wiper 24 is shown at $h$ and the diameter of the shaft 22 in the groove 23 is shown at $d$; thus $$R = h + \frac{d}{2}$$

The distance B equals $h+d$ or $R+d/2$. The maximum stroke of the slide 20 is $2h+d$. The width of the outer end portion of the wiper 24 is slightly less than $b$. The slide 20 reciprocates in the direction of the minor axis of its slot 20'. The configuration of the control shaft 1 is preferably identical to that of the control shaft 22.

FIG. 3 illustrates a portion of a third shifting mechanism which comprises an oscillatable motion receiving member or lever 124 having a slot 120 which is similar to the slot 20' of the slide 20 shown in FIG. 2. The lever 124 is oscillatable about an axis defined by a stationary pivot member 25 in parallelism with the axis of the control shaft 122. A projection 26 which replaces the shifter fork 18 or 19 extends into a recess 27 provided in a reciprocable shifter shaft 28. The latter controls the movements of a sliding gear, not shown.

It is clear that each of the mechanisms shown in FIGS. 2 and 3 can comprise two motion receiving members and two wipers which are angularly offset by 90 degrees.

Figure 4:
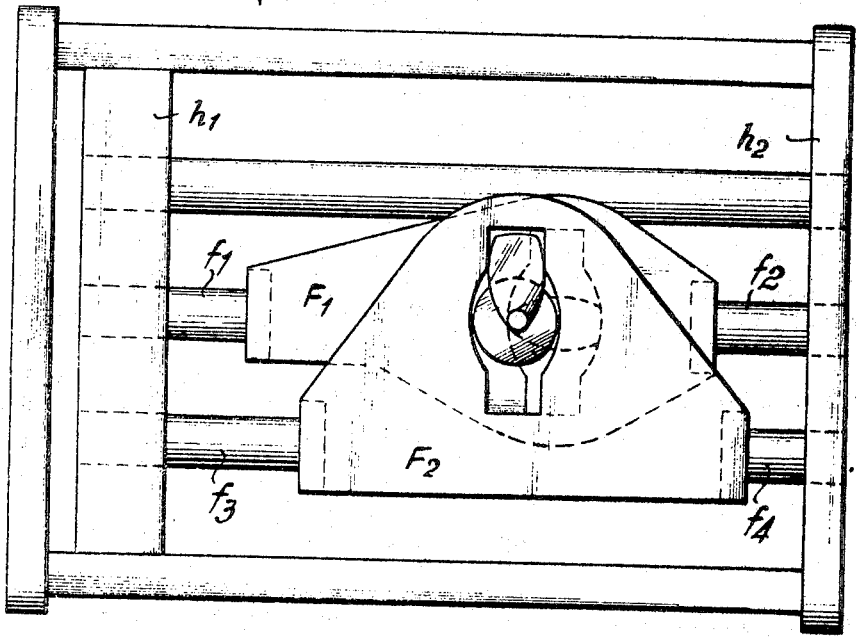
FIG. 4 is a schematic front elevational view of a fourth shifting mechanism.

FIG. 4 illustrates a further shifting mechanism wherein the motion transmitting trunnions $f1$, $f2$ of a first motion receiving member F1 are located at a level above the trunnions $f3$, $f4$ of a second motion receiving member F2. The trunnions $f1$–$f4$ are reciprocable in side walls $h1$, $h2$ of a housing H. In this embodiment of my invention, the trunnions $f1$–$f2$ and $f3$–$f4$ are located in two different planes.

Referring to FIG. 5, there is shown an indexing device for bringing about stepwise rotation of the control shaft 1. This indexing device comprises a Geneva drive having a Geneva wheel 29a with eight equidistant peripheral notches 29. The indexing pin 29′ is rotatable about an axis 29″ which is parallel to the axis of the control shaft 1. The wipers 2, 3 are shown in FIG. 5 in positions corresponding to those illustrated in FIG. 1c. The slides 4′, 5′ were omitted for the sake of clarity. Since the distance B at least equals $h+d$, each of the slides 4′, 5′ is positively held by the respective wiper 2, 3 in an end position, at least at such time when the respective wiper is located in a horizontal plane, i.e., twice during each revolution of the control shaft 1.

Figure 6:
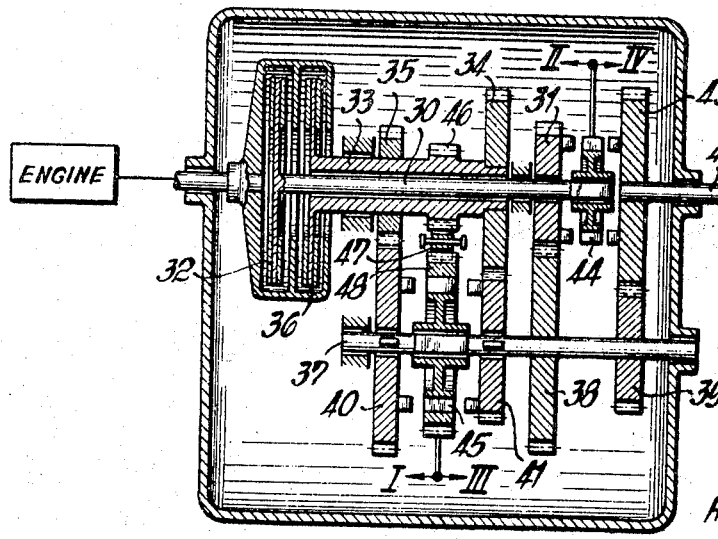
FIG. 6 is a diagrammatic sectional view of a progressive transmission which is operated by the improved shifting mechanism.

Referring finally to FIG. 6, there is shown a four-speed progressive transmission which can be operated by the improved shifting mechanism. The exact details of this transmission form no part of the present invention. It comprises a first input shaft 30 the right-hand end of which carries a gear 31 which is rotatable thereon. The other end of the shaft 30 carries the driven element of a clutch 32 whose driving element receives torque form an internal combustion engine or another prime mover. The first input shaft 30 is rotatable in a hollow second input shaft 33 which is rigid with two gears 34, 35 and with the driven element of a second clutch 36 whose driving element is rotated by the engine. The clutches 32, 36 are coaxial and adjacent to each other and one thereof is energized when the other is disengaged, or vice versa. Such change takes place during shifting to different speeds. A countershaft 37 is parallel to the input shafts 30, 33 and is rigid with two gears 38, 39. The countershaft 37 further supports two additional gears 40, 41 which are rotatable thereon. The main shaft or output shaft 42 is coaxial with the input shaft 30 and is rigid with a gear 43. The gears 31, 43, 40 and 41 are provided with synchronizing teeth which can respectively engage with teeth of sliding gears 44, 45 in a manner well known from the art of such transmissions. An additional gear 46 is mounted on the hollow input shaft 33 between the gears 34, 35; this gear can transmit torque to a gear 48 by way of an axially movable intermediate gear 47. The gear 48 is provided on the sliding gear 45. The gears 35 and 40, 34 and 41, 31 and 38, 43 and 39 are in mesh.

The transmission is shifted to first speed when the sliding gear 45 is moved in a direction to the left to transmit torque between the gear 40 and countershaft 37. The clutch 36 is then energized so that the engine drives the hollow input shaft 33 and gear 35. The latter drives the countershaft 37 by way of gears 40, 45 and the countershaft drives the main shaft 42 by way of gears 39, 43. In order to shift the transmission from first to second speed, the clutch 36 is disengaged and the clutch 32 is energized so that it drives the input shaft 30. Preparation for shifting into second speed involves moving the sliding gear 44 axially so that it transmits torque from the shaft 30 to the gear 31 whereby the latter drives the gear 39. Also, the sliding gear 45 is moved to neutral position.

To shift into third speed, the sliding gear 45 couples the gear 41 with the countershaft 37 so that the latter can be driven by the gear 34 on the hollow input shaft 33. The clutch 32 is disengaged and the clutch 36 is energized to rotate the shaft 33 and gear 34. The sliding gear 44 couples the gear 43 directly to the input shaft 30, the clutch 36 is disengaged, the clutch 32 is energized to drive the shaft 30, and the sliding gear 45 is returned to neutral position.

The sliding gears 44, 45 are reciprocable by the improved shifting mechanism. For example, the fork 18 of FIG. 1a can shift the gear 44 and the fork 19 can shift the gear 45.

It will be seen that shifting of transmission into a different position involves three steps, namely, engagement of one of the clutches 32, 36 and de-energization of the other clutch, engagement of one sliding gear with one of the associated gears, and movement of the other sliding gear to neutral position. When the control shaft is to shift into one of higher speeds, e.g., from first to second speed, it is rotated in a clockwise direction. In order to shift the transmission to reverse speed position, the control shaft is rotated counterclockwise from the position corresponding to first speed so that the positions of the wipers correspond to those in the fourth-speed or direct-drive position of the transmission. However, the intermediate gear 47 is shifted into mesh with the gears 46, 48. The main shaft 42 is then driven in reverse.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims:

1. In a shifting mechanism, particularly for progressive transmissions, a combination comprising a control member rotatable about a predetermined axis; a wiper provided on said control member and having an outer end portion remotest from and an inner end portion nearest to said axis; a motion receiving member provided with a slot accommodating said wiper and having two extensions located substantially diametrically opposite each other, said extensions having outermost parts spaced from each other by a distance which at least equals twice the distance between said axis and the outer end portion of said wiper, said motion receiving member further having a pair of concave internal surfaces disposed in said slot between said extensions and each of said internal surfaces having a radius of curvature corresponding substantially to the distance between said axis and the outer end portion of said wiper, the maximum width of said slot between said internal surfaces being at least equal to the sum of distances between said axis and the inner and outer end portions of said wiper; and motion transmitting means operatively connected with said motion receiving member.

2. A combination as defined in claim 1, further comprising a second wiper provided on said control member and being axially spaced from said first-mentioned wiper and angularly offset with reference thereto by 90 degrees, a second-motion receiving member having a second slot for said second wiper, and second motion transmitting means operatively connected with said second motion receiving member, one of said wipers entering one extension of the respective slot in response to each quarter revolution of said control member.

3. A combination as defined in claim 1, further comprising guide means for reciprocably guiding said motion transmitting means.

4. A combination as defined in claim 3, wherein said motion transmitting means comprises two coaxial trunnions extending from opposite sides of said motion receiving member and said guide means comprises slide bearings for said trunnions.

5. A combination as defined in claim 1, wherein said motion receiving member is oscillatable about a fixed pivot axis which is parallel to said first-mentioned axis.

6. A combination as defined in claim 5, wherein said motion transmitting means comprises a reciprocable member having a recess and said motion receiving member comprises a projection located diametrically opposite said fixed axis and extending into said recess.

7. A combination as defined in claim 1, further comprising indexing means for effecting stepwise rotation of said control member.

8. A combination as defined in claim 7, wherein said indexing means comprises a Geneva drive including a Geneva wheel coaxially secured to said control member and an index pin rotatable about an axis parallel to said first-mentioned axis and arranged to enter a different one of a series of peripheral notches provided on said wheel in response to each revolution thereof.

9. A combination as defined in claim 2, wherein said motion transmitting means comprise motion-transmitting members located in a common plane.

10. A combination as defined in claim 2, wherein said motion transmitting means comprise portions located in different planes.

11. A combination as defined in claim 1, wherein said motion transmitting means is reciprocable in a direction at right angles to said axis.

12. A combination as defined in claim 11, wherein said motion transmitting means comprises two coaxial trunnions extending from opposite sides of said motion-receiving member and wherein the common axis of said trunnions intersects said first-mentioned axis.

References Cited

UNITED STATES PATENTS

| 562,086 | 6/1896 | Livingstone | 74—50 |
| 1,089,186 | 3/1914 | Brockman. | |
| 1,889,909 | 12/1932 | Upton | 74—337.5 X |

MILTON KAUFMAN, Primary Examiner

U.S. Cl. X.R.

74—53, 54, 337.5